United States Patent
Liu et al.

(10) Patent No.: US 9,817,579 B2
(45) Date of Patent: Nov. 14, 2017

(54) MAXIMIZE SMR DRIVE CAPACITY

(71) Applicant: SEAGATE TECHNOLOGY LLC, Cupertino, CA (US)

(72) Inventors: Xiong Liu, Singapore (SG); Wenxiang Xie, Singapore (SG); Sze Chek Tan, Singapore (SG); Feng Shen, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 145 days.

(21) Appl. No.: 14/859,118

(22) Filed: Sep. 18, 2015

(65) Prior Publication Data

US 2017/0083246 A1    Mar. 23, 2017

(51) Int. Cl.
G11B 20/12    (2006.01)
G06F 3/06    (2006.01)
G06F 12/0868    (2016.01)

(52) U.S. Cl.
CPC .......... *G06F 3/0608* (2013.01); *G06F 3/068* (2013.01); *G06F 3/0656* (2013.01); *G06F 3/0658* (2013.01); *G06F 12/0868* (2013.01); *G11B 20/1217* (2013.01); *G11B 20/1252* (2013.01); *G06F 2212/1044* (2013.01); *G06F 2212/217* (2013.01); *G06F 2212/281* (2013.01); *G06F 2212/313* (2013.01); *G06F 2212/46* (2013.01); *G06F 2212/70* (2013.01); *G11B 2020/1238* (2013.01); *G11B 2020/1278* (2013.01); *G11B 2020/1292* (2013.01)

(58) Field of Classification Search
None
See application file for complete search history.

(56) References Cited

U.S. PATENT DOCUMENTS

| 4,161,752 | A | 7/1979 | Basilico | |
|---|---|---|---|---|
| 7,443,625 | B2 * | 10/2008 | Hamaguchi | G11B 5/012 360/55 |
| 7,486,460 | B2 * | 2/2009 | Tsuchinaga | G11B 5/012 360/48 |

(Continued)

OTHER PUBLICATIONS

Marks, H., Shingled Magnetic Recording Part 1: How SMR Expands Disk Drive Capacity, http://www.networkcomputing.com/storage/shingled-magnetic-recording-part-1-how-smr-expands-disk-drive-capacity/a/d-id/1234619?, Network Computing, Jan. 8, 2014.

*Primary Examiner* — K. Wong
(74) *Attorney, Agent, or Firm* — Holland & Hart LLP

(57) ABSTRACT

Systems and methods for maximizing shingled magnetic recording (SMR) drive capacity are described. In one embodiment, the SMR drive may include a main store to store user-accessible data, a media cache and media scratch-pad to store internal data temporarily for internal operations, and a storage controller to process read and write requests. In some cases, the main store comprises a shingled media partition and an unshingled media partition. The storage controller may designate one or more data tracks from the shingled media partition as temporary data track guard bands. In some embodiments, a track range is selected based at least in part on at least one of an amount of data in the media cache, a size of the new data in the media cache, and an association between the new data in the media cache and data currently stored within the selected track range.

20 Claims, 9 Drawing Sheets

(56) References Cited

U.S. PATENT DOCUMENTS

| | | | |
|---|---|---|---|
| 8,879,183 B1* | 11/2014 | Weikal | G11B 5/09 360/48 |
| 8,902,534 B2 | 12/2014 | Brockie et al. | |
| 8,922,930 B1* | 12/2014 | Weikal | G11B 20/10527 360/60 |
| 9,117,488 B1* | 8/2015 | Pantel | G11B 20/1252 |

* cited by examiner

MAXIMIZE SMR DRIVE CAPACITY

SUMMARY

The disclosure herein includes methods and systems for maximizing shingled magnetic recording (SMR) drive capacity. In some embodiments, the present systems and methods may configure the shingled data tracks of a shingled media partition and enable the storage device to write to the shingled tracks using temporary, logical guard bands instead of assigning a physical address to a guard band between SMR bands and using slim tracks for each data track instead of using a fat track adjacent to each physical guard band.

A storage device for maximizing SMR drive capacity is described. In one embodiment, the storage device may include a main store to store user-accessible data, a media cache to temporarily store user data, a media scratchpad to store internal data temporarily for internal operations, and a storage controller to write data to data tracks on the shingled media partition of the main store. In some cases, the main store comprises a shingled media partition and an unshingled media partition. The storage controller may designate one or more data tracks from the shingled media partition as temporary guard bands. In some embodiments, the track range is selected based at least in part on at least one of an amount of data in the media cache, a size of the new data in the media cache, and an association between the new data in the media cache and data currently stored within the selected track range.

In one embodiment, the storage controller may identify new data on the media cache to transfer to the main store. In some cases, the storage controller identifies new data on the media cache to transfer to the main store upon detecting the media cache is within a predetermined range of its capacity or detecting a host of the storage device is idle. In some embodiments, the storage controller may select a track range from tracks n to n+m among z total tracks in the shingled media partition of the main store. In some cases, n includes a positive integer from 1 to z, m includes a non-negative integer from 0 to z−1, and z includes a positive integer greater than 1.

In one embodiment, the storage controller is configured to copy the identified new data in the media cache to a data buffer, copy data on tracks n to n+m−1 to the data buffer, and copy data on track n+m to the media cache. In some cases, the storage controller may stitch together the copy of the new data in the data buffer with the copy of the data from tracks n to n+m−1 in the data buffer and copy the stitched data in the data buffer to the media scratchpad. In some embodiments, the storage controller may copy the stitched data in the media scratchpad to tracks n to n+m−1, wherein upon writing the copy of the stitched data in the media scratchpad to tracks n to n+m−1, track n+m−1 overlaps both track n+m−2 and track n+m.

In one embodiment, the storage controller may designate track n+m as a temporary guard band. Upon writing the copy of the stitched data in the media scratchpad to tracks n to n+m−1, track n+m may be overlapped by both track n+m−1 and n+m+1 when track n+m is not track z. If track n+m is the last track in the shingled media partition, then track n+m is overlapped by track n+m−1 only. In some cases, the storage controller may determine whether a track g among tracks n to n+m−1 is designated as a guard band and determine whether the media cache includes a copy of data from track g. Upon determining track g is designated a guard band and the media cache includes a copy of data from track g, the storage controller may copy the data from track g in the media cache to the data buffer. In this case, the storage controller may copy the data on tracks n to n+m−1 other than track g to the data buffer. The storage controller may stitch together the copy of the data from track g in the data buffer with the copy of the new data in the data buffer and the copy of the data from tracks n to n+m−1 other than track g in the data buffer.

In one embodiment, the storage controller may determine whether track n+m contains valid data. Upon determining track n+m contains no valid data, the storage controller may bypass writing track n+m to the media cache. Upon determining track n+m contains valid data, the storage controller may determine whether the media cache includes a copy of the data on track n+m. In some embodiments, upon determining track n+m contains valid data and the media cache includes a copy of the data on track n+m, the storage controller may bypass writing the data of track n+m to the media cache. Upon determining track n+m contains data and the media cache does not include a copy of the data of track n+m, the storage controller may copy the data of track n+m to the media cache.

A method for maximizing SMR drive capacity is described. In one embodiment, the method may include identifying data assigned to be written to a main store of a storage device and writing data to data tracks on the shingled media partition of the main store. In some cases, the storage device includes a main store for user-accessible data, a media cache to temporarily store portions of the user-accessible data, and a media scratch pad to store internal data temporarily for operations internal to the storage device. The main store may include a shingled media partition and an unshingled media partition. The storage controller may designate one or more data tracks from the shingled media partition as temporary guard bands.

An apparatus for maximizing SMR drive capacity is also described. In one embodiment, the apparatus may include a processor, memory in electronic communication with the processor, and instructions stored in the memory, the instructions being executable by the processor to perform the steps of identifying data assigned to be written to a main store of a storage device and writing data to data tracks on the shingled media partition of the main store. In some cases, the storage device includes a main store for user-accessible data, a media cache to temporarily store portions of the user-accessible data, and a media scratch pad to store internal data temporarily for operations internal to the storage device. The main store may include a shingled media partition and an unshingled media partition. The storage controller may designate one or more data tracks from the shingled media partition as temporary guard bands.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
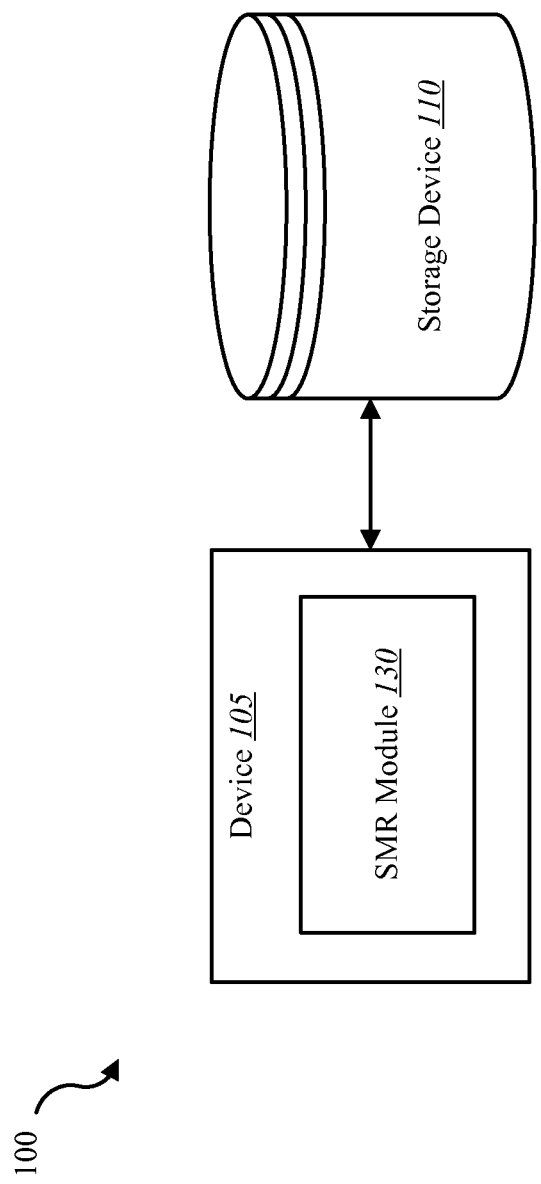
FIG. 1 is a block diagram of an example of a system in accordance with various embodiments.

The following relates generally to maximizing shingled magnetic recording (SMR) drive capacity. Shingled magnetic recording (SMR) is a magnetic storage data recording technology used in hard disk drives (HDDs) to increase storage density and overall per-drive storage capacity. Conventional hard disk drives record data by writing non-overlapping magnetic tracks parallel to each other. Shingled recording writes a subsequent track that overlap part of a previously written magnetic track, leaving the previous track thinner, but allowing for higher track density. Thus, the tracks partially overlap similar to roof shingles.

In some cases, the overlapping-tracks architecture may slow down the writing process since writing to one track overwrites adjacent tracks, and requires them to be rewritten as well. A device-managed SMR device conceals this complexity by managing the SMR and non-SMR regions of the storage drive via the firmware of the storage drive, presenting an interface like any other hard disk from point of view of the host operating system. On the other hand, SMR devices that are host-managed rely on the operating system to manage the SMR and non-SMR regions of the drive.

In some cases, an SMR drive may be divided into multiple bands. The bands may be physical allocations of the SMR drive. To the host, the user-accessible portion of the SMR drive may appear as a continuous block of storage based on logical block addressing (LBA), but these LBA logical allocations may be physically divided into bands, each band containing a certain number of tracks. Each SMR band includes a set of data tracks, a physically allocated guard band, and a fat track adjacent to the guard band. The guard band is a physical allocation on the drive that separates one band from another. The fat track is a data track that is not overlapped or shingled by any other data track. Thus, the fat track is a data track of typical non-SMR width. The slim tracks are data tracks that are overlapped or shingled by other data tracks. SMR bands are an important concept for SMR drives, but conventional SMR bands also induce some drawbacks. For example, the fat tracks and guard bands of a conventional SMR drive consume the SMR drive's capacity (e.g., 2% of drive capacity with 50 tracks/band). Also, the fat track, slim tracks, and guard band increase the complexity of servo track seeking and other track management functions.

In one embodiment of the present systems and methods, the fat tracks and guard bands are removed from the SMR drive. Removing the fat track and guard band maximizes the SMR drive capacity without trade-offs for performance. Since all of tracks are slim tracks and data tracks, drive capacity is not wasted due to fat tracks and guard bands. Moreover, in conventional SMR drives, the logically allocated space of the drive may be divided into zones. In some cases, the physical bands may be mismatched with the logical zones, resulting in wasted capacity. Removing the fat track and guard band results in the drive capacity not being wasted due to band size and zone size mismatches. Moreover, with these systems and methods, a write operation, or rewrite operation (RO), can start from any track and end at any track, resulting in rewrite operations being more efficient and faster since there is no need to read/write until the end of band when there is no band boundary. Thus, a rewrite operation can cross many of the traditional bands that would exist in a conventional SMR drive. Eliminating the physical SMR bands simplifies track management and data flow. Moreover, removing physical SMR bands reduces the complexity of servo track seeking and other track management functions, further improving device efficiency.

In some embodiments, a physical band may be inserted, for example, a physical guard band may be located around middle diameter (MD) of a hard disk to separate a shingle direction. In some embodiments, an empty data track may be identified and selected as a temporary guard band between a group of tracks. In some cases the present systems and methods may be combined with track usage management (TUM). In some cases, an empty track may be selected as the last track within a range of tracks that are used in a rewrite operation. If the last track contains valid data, the data of the last track may be stored in a media cache, as the rewrite operation of the present systems and methods may result in the last track of the range being overlapped or shingled by the second to last track in the selected range. Thus, in some cases, the last track of the range of tracks may be overlapped twice as a result of the rewrite operation. For example, "track N" may be a track within a group of tracks being recorded on in a first shingled write operation (e.g., a first rewrite operation, etc.), resulting in track N being shingled by a subsequent track, track O. Following this first shingled write operation, track N may be selected as the last track in a selected range of tracks for a second shingled write operation (e.g., a second rewrite operation, etc.). As a result of the second shingled write operation, track N may be shingled by a preceding track, track M. Thus, as a result of both write operations, track N, the last track in the selected range, may be shingled by both a subsequent track, track O, in a first shingled write operation, as well as a previous track, track M, in a second shingled write operation that occurs after the first shingled write operation. However, in the case where the last track is empty or does not contain valid data, then there is nothing valid to copy from the last track, and if there is nothing valid to copy then a read of the last track is bypassed, thus reducing the number of operations performed in the rewrite operation of the present systems and methods.

The guard bands of a conventional SMR drive are assigned to a physical band, a physically addressed portion of the shingled media partition of the SMR drive. The proposed guard bands are virtual and not tied to any physical space, but float from data track to data track. In one embodiment, the proposed temporary guard bands may be dynamically assigned by removing a mapping between a logical block address for a particular data track and designating the data track temporarily as a data track guard band. In some cases, the designation of the data track as a temporary guard band may be recorded in a table of temporary guard bands.

In some embodiments, a rewrite operation may be triggered when a media cache is full and/or reaches a predetermined percentage of its capacity. In some cases, a rewrite operation may be triggered when the storage drive host (e.g., operating system hosting the SMR drive) is idle. In some cases, the present systems and methods may enable an SMR drive without physical SMR bands. Thus, instead of writing to the end of an SMR band with each read/modify/write operation in a conventional SMR drive, any number of tracks from one to the maximum number of tracks may be selected for a rewrite operation. In some cases, a range of tracks may be selected to maximize clearing of the media cache. In some cases, a track may be selected for the track range because the media cache contains data associated with data in that track. For example, the data in media cache may include an update to the data on that track. In some cases, the present systems and methods may identify empty tracks and select empty tracks as the last track in the selected range of tracks in a rewrite operation to improve device performance.

FIG. 1 is a block diagram illustrating one embodiment of an environment 100 in which the present systems and methods may be implemented. The environment may include device 105 and storage device 110. The storage device 110 may include any combination of hard disk drives, solid state drives, and hybrid drives that include both hard disk and solid state drives. The storage device 110 may include a volatile cache (e.g., disk buffer, static random access memory (RAM), dynamic RAM, etc.), a main store, a media cache, and/or a media scratch pad. The volatile cache may hold data temporarily such as new data to be stored on the storage device 110 and/or data already stored at a first storage location of storage device 110 being transferred to a second storage location. The main store may include media on the storage device 110 accessible to a user. For example, a user that stores a file on storage device 110 may store the file in the main store of storage device 110. On the other hand, the media cache and media scratch pad may include media on the storage device (e.g., the same media as the main store) that is inaccessible to the user. Instead the media cache and media scratch pad may be accessible to a host processor and memory and/or a storage controller of storage device 110 to perform internal operations and functions of the storage device 110 and/or host. In some embodiments, the systems and methods described herein may be performed on a single device (e.g., device 105). In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, etc. In some configurations, device 105 may include a shingled magnetic recording (SMR) module 130. In one example, the device 105 may be coupled to storage device 110. In some embodiments, device 105 and storage device 110 may be components of an SMR drive. Alternatively, device 105 may be a component of a host (e.g., operating system, host hardware system, etc.) of the storage device 110.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, etc. In one example, device 105 may be operable to receive data streams, store and/or process data, and/or transmit data from, to, or in conjunction with one or more local and/or remote computing devices.

The device 105 may include a database. In some cases, the database may be internal to device 105. For example, storage device 110 may include a database. Additionally, or alternatively, the database may include a connection to a wired and/or a wireless database. Additionally, as described in further detail herein, software and/or firmware (e.g., stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), etc. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. Storage device 110 may include a hard disk drive (HDD) with an SMR region. SMR module 130 may maximize SMR drive capacity of storage device 110 by storing data in the SMR region of storage device 110 without conventional, physically allocated guard bands or the fat tracks that are adjacent to each guard band in a conventional SMR drive. In some cases SMR module 130 may use one or more data tracks as temporary, floating guard bands within the SMR region of storage device 110. Thus, instead of assigning a physical area or space of a shingled media partition in storage device 110, SMR module 130 may select a data track within the shingled media partition as a temporary data track guard band. When new data is received at storage device 110, SMR module 130 may combine data already written to one or more data tracks of the shingled media partition with the new data and rewrite this combination to a set or range of tracks. In writing this combined data to the second to last track in this range of tracks, the SMR module 130 may write over a portion (e.g., a leading-in portion) of the last data track in the range of tracks. Another portion (e.g., a leading-out portion) of this last data track may have already been written over from a previous write operation. Thus, the last track may be designated as a temporary data track guard band, and if it contained data this data may be stored temporarily in media cache. During a subsequent rewrite operation, the last track may be converted back to a regular data track where another data track may be selected as a temporary data track guard band. Thus, a temporary guard band may revert to a data track with valid data written to its track. As part of writing this combined data to the shingled media partition, the SMR module 130 may select a different data track as a new temporary guard band. Thus, the temporary guard bands may float from data track to data track. Thus, each time the SMR module 130 performs a rewrite operation, a current temporary guard band may revert to a data track and a current data track may be converted to be a temporary guard band.

Figure 2:
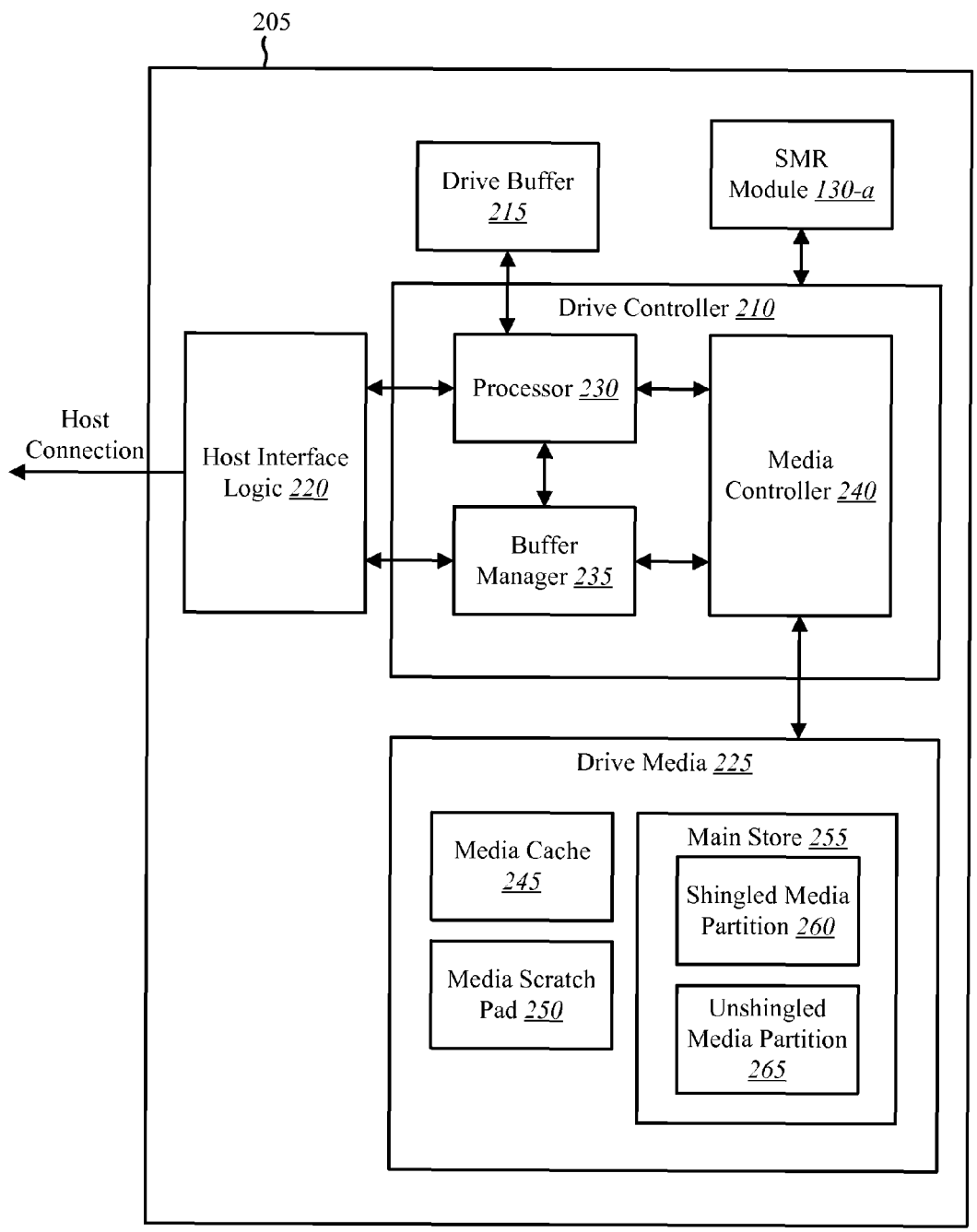
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive buffer 215, host interface logic 220, drive media 225, and SMR module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205 (e.g., an operating system, host hardware system, etc.). The driver buffer 215 may hold data temporarily for internal operations of apparatus 205. For example, a host may send data to apparatus 205 with a request to store the data on the drive media 225. The driver controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215.

In one embodiment, the drive media 225 may include a media cache 245, a media scratch pad 250 and a main store 255. The main store 255 may include a shingled media partition 260 and an unshingled media partition 265. In one embodiment, the media cache 245, media scratch pad 250, and main store 255 may be different partitions of a hard disk drive. For example, the media cache 245 partition may start at the beginning of the physical disk (e.g., physical LBA 0). The media scratch pad may start where the media cache ends. Next, the main store may start where the media scratch pad ends. The start of the main store may coincide with the beginning of storage available to the host of the apparatus 205 (e.g., Host LBA 0). Thus, the main store may represent the capacity of drive media 225 reported to the host (e.g., Host LBA 0 to Host LBA Maximum). In one embodiment, the unshingled media partition may start at host LBA 0 and the shingled media partition may start where the unshingled media partition ends and end at Host LBA Maximum. In some embodiments, a track includes multiple LBAs (e.g., 300 LBAs per track, etc.). In some cases, both the main store 255 and the media cache 245 may be allocated Host LBAs.

Although depicted outside of drive controller 210, in some embodiments, SMR module 130-a may include software, firmware, and/or hardware located within drive controller 210. For example, SMR module 130-a may include at least a portions of processor 230, buffer manager 235, and/or media controller 240. In one example, SMR module 130-a may include one or more instructions executed by processor 230, buffer manager 235, and/or media controller 240. The SMR module 130-a may be configured to maximize an SMR drive capacity by removing conventional physical guard bands and the fat tracks next to each physical guard band, and using data tracks as temporary data track guard bands that float from data track to data track as needed.

Figure 3:
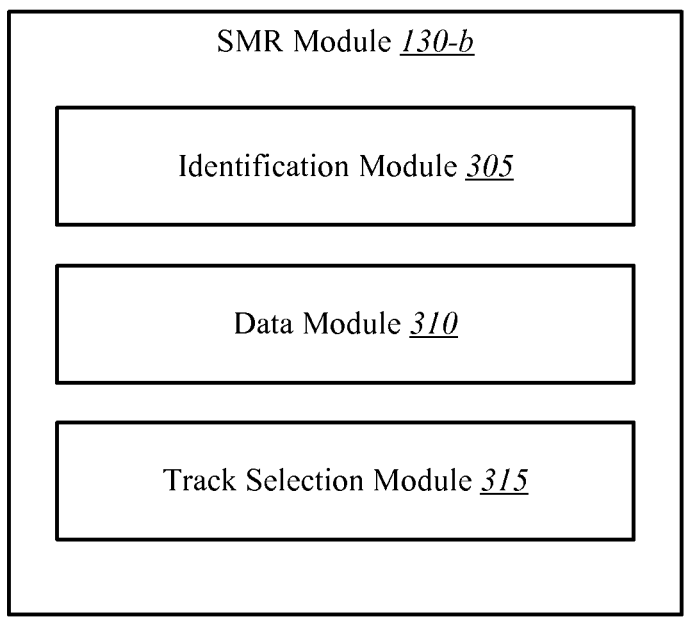
FIG. 3 shows a block diagram of a device in accordance with various aspects of this disclosure.

FIG. 3 shows a block diagram 300 of an SMR module 130-b. The SMR module 130-b may include one or more processors, memory, and/or one or more storage devices. The SMR module 130-b may include identification module 305, data module 310, and track selection module 315. The SMR module 130-b may be one example of SMR module 130 of FIGS. 1 and/or 2. Each of these components may be in communication with each other.

In one embodiment, identification module 305 may identify data assigned to be written to a storage device. In some embodiments, data module 310 may operate in conjunction with a media cache, media scratchpad, and/or main store of a storage device (e.g., storage device 110 of FIG. 1 and/or apparatus 205 of FIG. 2). In one example, the main store may include a shingled media partition and an unshingled media partition (e.g., shingled and unshingled media partitions 260 and 265, respectively, of FIG. 2). The main store may include shingled media and unshingled media that are both available to store user-accessible data. The media cache and/or media scratchpad may include portions of the device media that are used to store data temporarily for internal operations. In some cases, data module 310 may write data to data tracks on the shingled media partition of the main store. The track selection module 315 may designate one or more data tracks from the shingled media partition as temporary, floating guard bands. Thus, instead of assigning a physical area or physically allocated track of a hard disk drive as a guard band between tracks within a zone of tracks and/or tracks from different zones as is done in conventional SMR drives, data module 310 may assign one or more data tracks as temporary guard bands.

In one embodiment, identification module 305 may identify new data on the media cache to transfer to the main store. In some cases, the identification module 305 may identify new data on the media cache to transfer to the main store upon detecting the media cache is within a predetermined range of its storage capacity and/or detecting a host of the storage device is idle. For example, when the storage cache is within a certain percentage of being filled to capacity, track selection module 315 may assign data from the storage cache to one or more tracks of the storage device and data module 310 may write the data to the assigned tracks. Likewise, when identification module 305 detects that a host is idle (e.g., an operating system and/or host processor/memory associated with the storage device is idle), track selection module 315 may assign data from the storage cache to one or more tracks of the storage device and data module 310 may write the data to the assigned tracks.

In one embodiment, track selection module 315 may select a track range from tracks n to n+m among z total tracks in a shingled media partition of the main store. The value "n" may include a positive integer from 1 to z, the value "m" may include a non-negative integer from 0 to z−1, and the value "z" may include a positive integer greater than 1 limited by the number of tracks available on the storage media. Thus, if n=8 is selected by track selection module 315 as a starting track and m=12 is selected by track selection module 315 as a range, then tracks 8 through 20 are selected by track selection module 315. As another example, if z=30,000 and track selection module 315 selects all the tracks, then track selection module 315 selects n=1 as the starting track (i.e., the first available track), and selects m=29,999 as the range, thus selecting all the available tracks. In some cases, the track selection module 315 may select a track range based at least in part on a size of the new data in the media cache to be written to a track and/or an association between the new data in the media cache and data already written to the selected track range.

In one embodiment, data module 310 may copy the identified new data in the media cache to a data buffer, data on tracks n to n+m−1 to the data buffer, and data on track n+m to the media cache. Thus, if n=5 and m=20, then the data contained in tracks 5-19 may be written to the data buffer along with the new data in media cache, and valid data in track 20 may be written to the media cache. In some cases, data module 310 may stitch together the copy of the new data in the data buffer with the copy of the data from tracks n to n+m−1 copied to the data buffer. Thus, the data from tracks n to n+m−1 may be modified to include the new data. Data module 310 may copy this stitched or combined data in the data buffer to the media scratchpad. The media scratchpad may store the stitched data temporarily. In some embodiments, data module 310 may copy the stitched data in the media scratchpad to tracks n to n+m−1. Upon writing the copy of the stitched data in the media scratchpad to tracks n to n+m−1, track n+m−1 may overlap both track n+m−2 and track n+m. Thus, if n=5 and m=20, track 24 may overlap both track 23 and track 25 after the portion of the stitched data is written to track 24. Because data module 310 writes any valid data on track 25 to the media cache as part of combining the new data with the existing data between tracks n and n+m−1, overwriting track 25 does not result in the data from track 25 being lost.

In some embodiments, track selection module 315 may designate track n+m as a temporary guard band. Using the example of n=5 and m=20, track selection module 315 may designate track 25 as a temporary guard band. Upon writing the copy of the stitched data in the media scratchpad to tracks n to n+m−1, track n+m may be overlapped by both track n+m−1 and n+m+1 when track n+m is not track z. Thus, if n=5, m=20, and z=30,000 and the stitched data is written to tracks n to n+m−1, then track 25 may be overlapped by both track 24 and track 26 as long as track n+m is not the last available track. If track n+m is the last available track, then track n+m is only overlapped by track n+m−1 after writing the stitched data to tracks n to n+m−1. With the example where n=5 and m=20, it is noted that at least a portion of these tracks may be empty. For example, a storage device may receive an update to a file stored within tracks 5-20, the original file may using tracks 5-20. After receiving the update, the track selection module 315 may determine that at least four additional tracks are needed to update the existing file with the update, then track selection module 315 may select tracks 5-25 to merge the update with the existing file, track 25 being used as a temporary guard band. In some cases, the identification module 305 may determine whether a track within a selected track range is empty (e.g., contains no data, contains invalid data, etc.). Upon the identification module 305 identifying a data track within the selected track range as empty, the data module 310 may bypass performing a read operation on the empty data track.

In some cases, a prior writing operation may designate a certain track "g" as a temporary guard band. Subsequent to this designation, track selection module 315 may select a track range that includes the track g within the range of tracks. Thus, in one embodiment, identification module 305 may determine whether a track g among tracks n to n+m−1 is designated as a guard band. For example, in a first write operation where n=5 and m=10, track n+m, or track 15, is designated as a temporary guard band. Assuming track 15 contains valid data, the data module 310 writes the data from track 15 to media cache. In a second write operation n=5 and m=15. Thus, in the second write operation track n+m, or track 20, is designated as a temporary guard band, and track 15 (i.e., track "g"=track 15), the temporary guard band in the first write operation, is written back to track 15 in the second write operation based on the data from track 15 in the media cache, since track 15 would have been overwritten as part of the first writing operation. Upon determining track g is designated a guard band from a prior write operation and the media cache includes a copy of data from track g, data module 310 may copy the data from track g in the media cache to the data buffer, as track g would have been overwritten by track g−1 in the prior writing operation. Accordingly, data module 310 may copy all valid data from tracks n to n+m−1, except track g, to the data buffer. Data module 310 may stitch together the copy of the data from track g copied from the media cache to the data buffer with the copy of the new data in the data buffer and the copy of the data from tracks n to n+m−1 other than track g copied from their respective track to the data buffer. Thus, data module 310 merges this data with the data from the other tracks and the new data, and writes this data to tracks n to n+m−1 in the second write operation. Accordingly, during each write operation, the identification module 305 may determine whether the media cache includes a copy of the data for one or more tracks within the selected track range.

As described in the embodiments above, data from tracks n to n+m−1 may be copied to a drive buffer and combined with a copy of new data in the data buffer. This combination of data may be written to data tracks n to n+m−1. Track n+m is overlapped or shingled as data is written to track n+m−1. Thus, data module 310 stores a copy of data from track n+m in the media cache and track n+m is designated as a temporary guard band. The data from track n+m remains in the media cache until this data is written once more to track n+m in a subsequent write operation. But if track n+m does not contain data, then there is no need to store a backup track n+m in media cache. Thus, in some embodiments, identification module 305 may determine whether track n+m contains valid data. Upon determining track n+m contains no valid data, data module 310 may bypass writing track n+m to the media cache. On the other hand, upon determining track n+m contains valid data, data module 310 may write a copy of this valid data to media cache. In some embodiments, the data from track n+m may already be written to media cache. Upon determining track n+m contains valid data and the media cache includes a copy of the data on track n+m, data module 310 may bypass writing the data of track n+m to the media cache. On the other hand, upon determining track n+m contains data and the media cache does not include a copy of the data of track n+m, data module 310 may copy the data of track n+m to the media cache.

Figure 4:
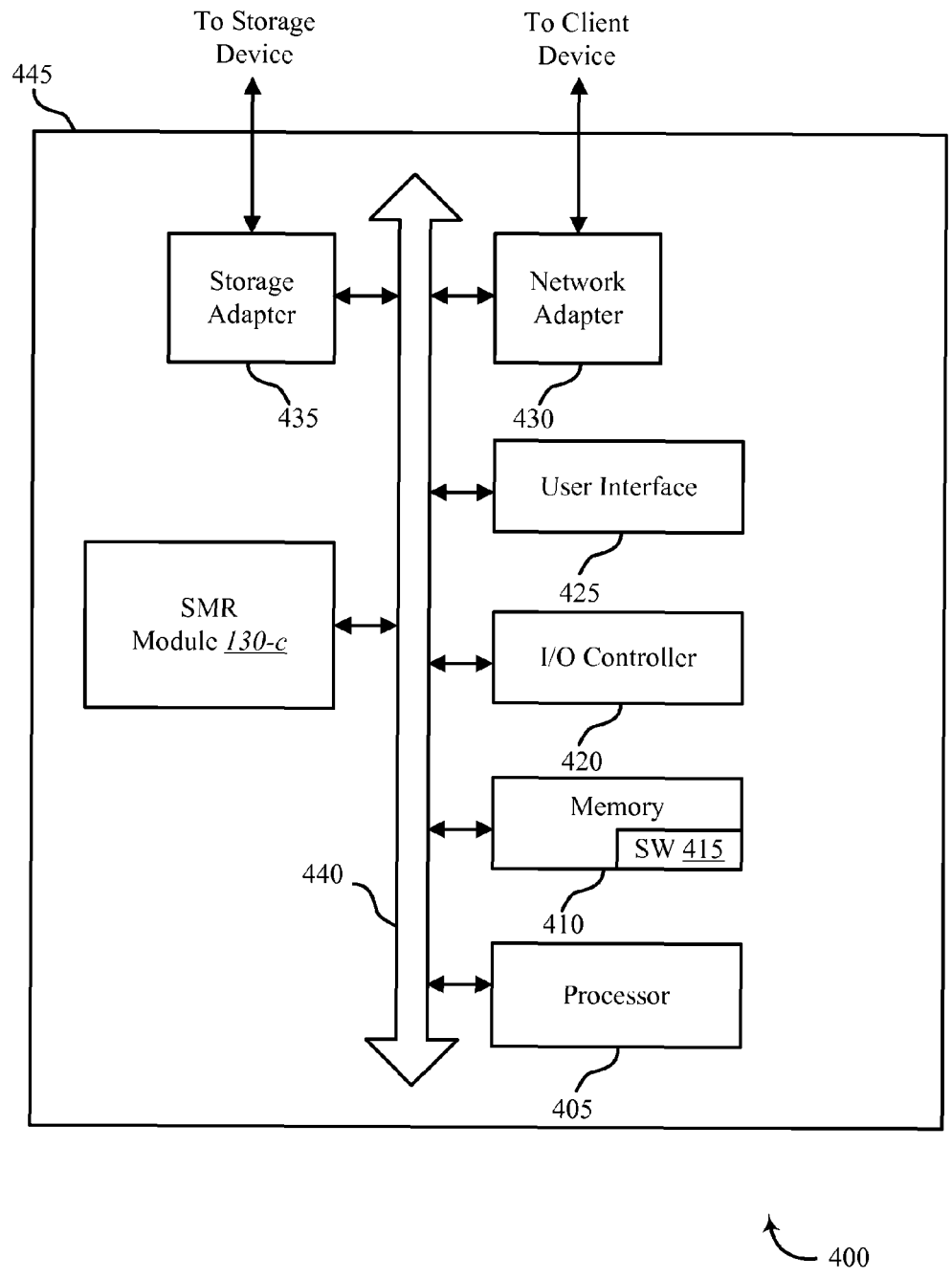
FIG. 4 shows a diagram of a system in accordance with various aspects of this disclosure.

FIG. 4 shows a system 400 for maximizing SMR drive capacity, in accordance with various examples. System 400 may include an apparatus 445, which may be an example of any one of device 105 of FIG. 1 and/or apparatus 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (e.g., apparatus 445 communicating directly with a storage system) and/or indirect (e.g., apparatus 445 communicating indirectly with a client device through a server).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally— via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include an SMR module 130-*b*, which may perform the functions described above for the SMR modules 130 of FIGS. 1, and/or 2.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 440 may allow data communication between one or more elements of apparatus 445 (e.g., processor module 405, memory 410, I/O controller module 420, user interface module 425, network adapter 430, and storage adapter 435, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405, but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output system (BIOS) which may control basic hardware and/or software operation such as the interaction with peripheral components or devices. For example, at least a portion of the SMR module 130-*b* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 430, etc.).

Many other devices and/or subsystems may be connected to one or may be included as one or more elements of system 400 (e.g., personal computing device, mobile computing device, smart phone, server, internet-connected device, cell radio module, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices (e.g., device 105 of FIG. 1), and/or other devices such as the apparatus 205 of FIG. 2. Network adapter 430 may provide wired and/or wireless network connections. In some cases, network adapter 430 may include an Ethernet adapter or Fibre Channel adapter. Storage adapter 435 may enable apparatus 445 to access one or more data storage devices (e.g., storage device 110). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
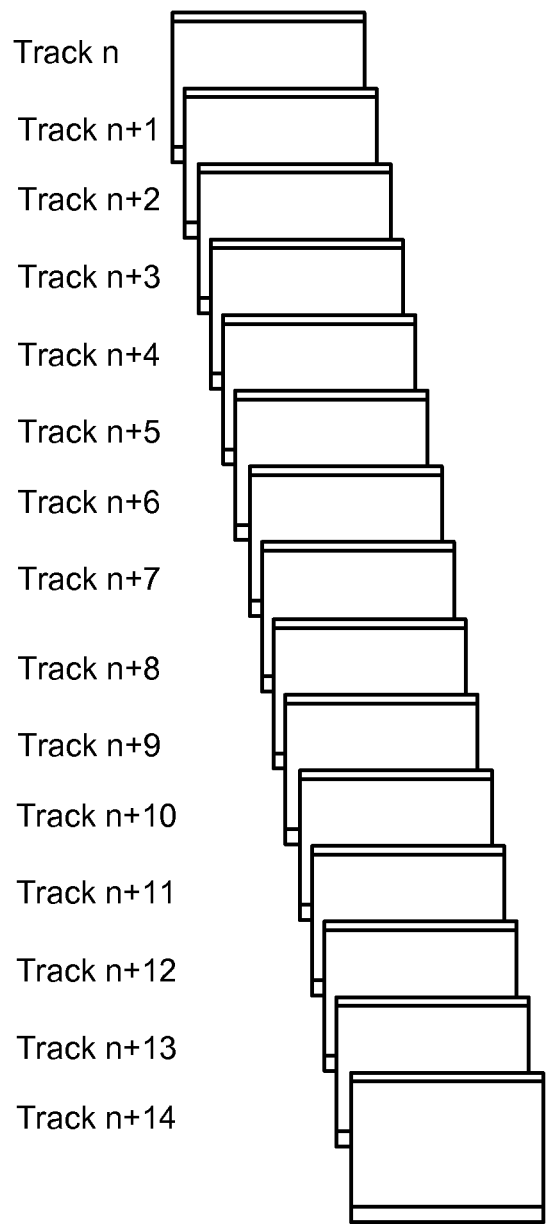
FIG. 5 shows one embodiment of an environment in accordance with various aspects of this disclosure.

FIG. 5 shows an environment 500 for maximizing SMR drive capacity, in accordance with various examples. At least one aspect of environment 500 may be implemented in conjunction with device 105 of FIG. 1, apparatus 205 of FIG. 2, and/or SMR module 130 depicted in FIGS. 1, 2, 3, and/or 4.

As depicted, environment 500 depicts one embodiment of data tracks from a shingled media partition (e.g., shingled media partition 260 of FIG. 2), where track n+1 is shingled over track n, track n+2 over track n+1, and so forth. In one embodiment, the environment 500 depicts one embodiment of a proposed track layout of an SMR drive. As depicted, tracks n through n+14 are data tracks without a guard band and fat track that precedes each guard band in a conventional SMR drive.

Although environment 500 depicts 15 shingled tracks, from track n to track n+14. In one embodiment, tracks n to n+14 represent a portion of a total number of tracks on a shingled media partition. In some embodiments, tracks n to n+14 represent the total number of tracks of a shingled media partition. For example, a shingled media partition may include 50,000 tracks. Thus, in some embodiments, tracks n to n+14 are a representation of the total number of tracks in a shingled media partition, whether the total number of tracks numbers in the tens, hundreds, or thousands, etc.

In one embodiment, environment 500 may depict one example of a new, formatted, or trimmed SMR drive prior to any data being written to the tracks. Alternatively, environment 500 may depict an SMR drive with all of the tracks containing data, where tracks n to n+14 represent a total set of tracks in a shingled media partition. In some embodiments, tracks n to n+14 may represent shingled tracks from a portion of the total number of tracks in a shingled media partition. Thus, tracks n to n+14 may represent data written to all the tracks of this portion of the total number of tracks in the shingled media partition.

The value "n" from environment 500 (e.g., track "n") may be any non-negative integer from 0 to a value representing a final track within a shingled media partition. For example, if there are 256 tracks in a shingled media partition, then "n" may be any value between 0 and 255. It is noted that if "n" were set to 255, then the depicted tracks following track n would not exist, as track n would be the last track. Thus, if ten tracks are selected among 256 total tracks, then "n" would be any value between 0 and 246. If "n" were 246 and ten tracks were selected, then track n to track n+9 would be selected, where n=246 would be the first track of the ten selected tracks and n+9=255 would be the final track selected of the ten selected tracks, as well as the final track among the 256 total tracks.

Figure 6:
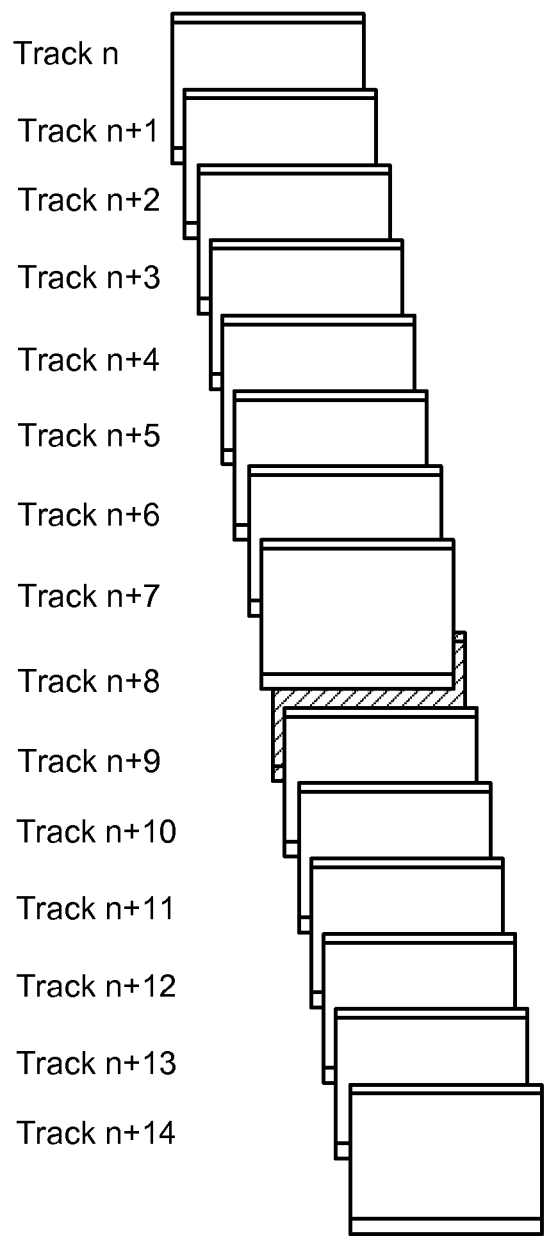
FIG. 6 shows another embodiment of an environment in accordance with various aspects of this disclosure.

FIG. 6 shows an environment 600 for maximizing SMR drive capacity, in accordance with various examples. Environment 600 may be one example of environment 500 of FIG. 5. At least one aspect of environment 600 may be implemented in conjunction with device 105 of FIG. 1, apparatus 205 of FIG. 2, and/or SMR module 130 depicted in FIGS. 1, 2, 3, and/or 4.

As depicted, environment 600 depicts one embodiment of data tracks from a shingled media partition (e.g., shingled media partition 260 of FIG. 2). In one embodiment, the environment 600 depicts one embodiment of a proposed track layout of an SMR drive. As depicted, tracks n through n+14 are data tracks without guard bands and the fat tracks that precede each guard band in a conventional SMR drive.

In one embodiment, environment 600 depicts the results of a first rewrite operation (RO) in accordance with the systems and methods described herein. According to these systems and methods, a track range for the first rewrite operation is selected. For example, a head track "n" may be selected among available tracks along with a range "m," giving a range from track n to track n+m. In some embodiments, the track head ("n") and track range ("m") may be selected to maximize clearing the media cache, where at least a portion of the data temporarily stored on the media cache is removed and/or marked as invalid to allow different data to be written where the invalidated data is written.

Data from tracks n to n+m may be read, with data from tracks n to n+m−1 being read into a data buffer and data from track n+m being written to media cache. If the media cache already includes the data from track n+m or track n+m is empty (i.e., no valid data on track n+m), then track n+m is not read. If the data from one or more tracks between track n and n+m−1 is already written to the media cache, then the data from these one or more tracks is not read from the track. In some cases, the copies of the data from these one or more tracks may be copied from media cache to the data buffer. In some cases, the data from the one or more tracks in media cache is copied from the media cache and written to the media scratch pad and/or copied back to their respective tracks from media cache.

In some embodiments, new data associated with the data on tracks n to n+m is also written to the data buffer. In one embodiment, the data from tracks n to n+m−1 is modified (i.e., stitched together) with the new data and this modified data is written to the media scratch pad. The stitched data is then written from the media scratch pad to the tracks n to n+m−1 on the main store.

As one example, depicted in environment 600, a track range may be selected for a first rewrite operation, where track n is selected as the head track and track n+8 (i.e., m=8) is selected as the last track in the selected track range. Data from tracks n to n+7 (i.e., track n+m−1) may be read and copied to a data buffer. New data associated with at least one of the tracks n to n+8 and/or the data on at least one of the tracks n to n+8 may be read from media cache to the data buffer. The data from track n+8 may be copied into media cache if track n+8 contains valid data and the data in track n+8 is not already written to media cache. The new data is stitched with the data from tracks n to n+7. The stitched data is written to the media scratchpad to protect this data in case of device failure and/or power loss, etc. The stitched data in the media scratchpad is copied to the tracks n to n+7. During the first rewrite operation, a portion of the stitched data is written to track n+7, resulting in track n+8 being overlapped by track n+7. Thus, as depicted in FIG. 6, both tracks n+7 and n+9 overlap track n+8 (i.e., the cross-hatched track) following the first rewrite operation, track n+9 having overlapped track n+8 in a previous write operation and track n+7 overlapping track n+8 during the first rewrite operation. In one embodiment, if a request is received that includes a request for the data from tracks n to n+8, the data on tracks n to n+7 are read and the data from track n+8 in media cache is read and these two sets of data are provided together in reply to the request. Track n+8 is designated as a temporary guard band.

Figure 7:
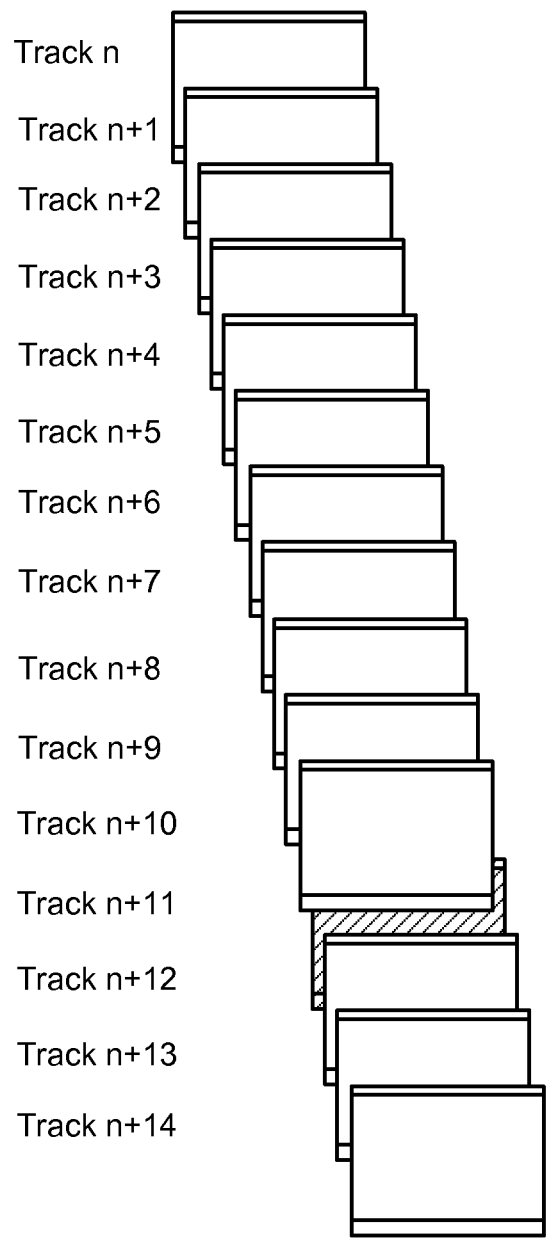
FIG. 7 shows another embodiment of an environment in accordance with various aspects of this disclosure.

FIG. 7 shows an environment 700 for maximizing SMR drive capacity, in accordance with various examples. Environment 700 may be one example of environment 500 of FIG. 5 and/or environment 600 of FIG. 6. At least one aspect of environment 700 may be implemented in conjunction with device 105 of FIG. 1, apparatus 205 of FIG. 2, and/or SMR module 130 depicted in FIGS. 1, 2, 3, and/or 4.

As depicted, environment 700 includes data tracks from a shingled media partition (e.g., shingled media partition 260 of FIG. 2). Environment 700 may depict one example of proposed track layout of an SMR drive. As depicted, tracks n through n+14 are data tracks without guard bands and the fat tracks that precede each guard band in a conventional SMR drive.

In one embodiment, environment 700 depicts the results of a second rewrite operation subsequent to the first rewrite operation depicted of FIG. 6. New data is written to the media cache. Based on this new data (i.e., size of the new data, association of the new data to the track data, etc.), a track range is selected from track n+5 to track n+11. The present systems and methods may determine whether data from tracks n+5 to track n+11 is written to media cache. Since data from track n+8 was previously written to the media cache in the first rewrite operation, the present systems and methods copies data from tracks n+5, n+6, n+7, n+8, n+9, and n+10 to the data buffer. The data from track n+8 is copied from media cache to the data buffer. The present systems and methods then determine whether track n+11, the last track in the track range, contains valid data. If track n+11 is empty, no more is reads are performed in relation to the track data. If track n+11 does contain valid data and this data is already in media cache, again no more reads are performed for the track data. If track n+11 contains valid data and the data is not already in media cache, the present systems and methods copies the data from track n+11 to media cache.

In one embodiment, the new data in the data buffer is stitched with the data from tracks n+5 to n+10 in the data buffer. The stitched data is written to the media scratchpad and then copied from the media scratchpad from track n+5 to track n+10. During the second rewrite operation, a portion of this stitched data is written to track n+10, resulting in track n+11 being overlapped by track n+10. Thus, as depicted in FIG. 7, both tracks n+10 and n+12 overlap track n+11 (i.e., the cross-hatched track) following the second rewrite operation, track n+12 having overlapped track n+11 in a previous write operation and track n+10 overlapping track n+11 during the second rewrite operation. As depicted, data belonging to track n+8 is written to track n+8 during the second rewrite operation. Thus, as part of the second rewrite operation, track n+8, the previous temporary guard band from the first rewrite operation, is converted back to a regular data track just as it was before the first rewrite operation, and track n+11 is designated as a temporary guard band.

Figure 8:
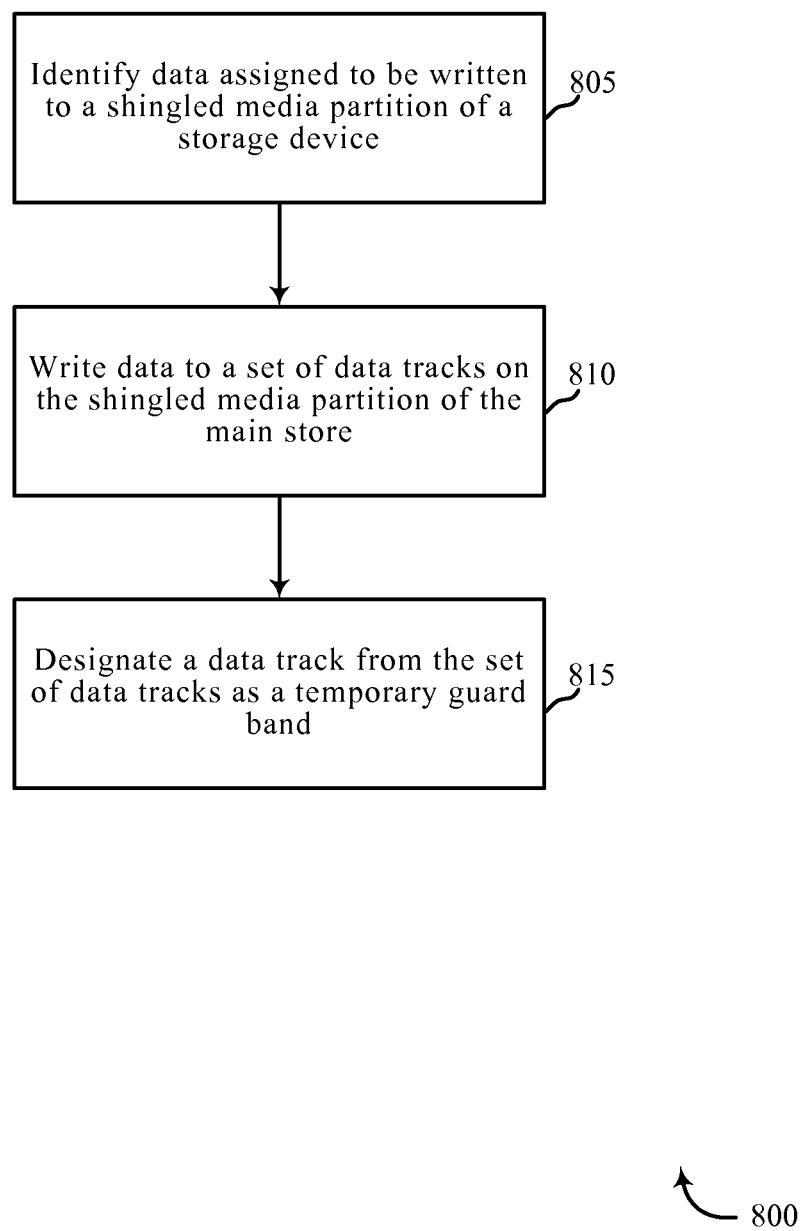
FIG. 8 is a flow chart illustrating an example of a method in accordance with various aspects of this disclosure.

FIG. 8 is a flow chart illustrating an example of a method 800 for maximizing SMR drive capacity, in accordance with various aspects of the present disclosure. One or more aspects of the method 800 may be implemented in conjunction with device 105 of FIG. 1, apparatus 205 of FIG. 2, and/or SMR module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 805, the method 800 may include identifying data assigned to be written to a shingled media partition of a storage device. At block 810, the method 800 may include writing data to a set of data tracks on the shingled media partition of the main store. At block 815, the method 800 may include designating a data track from the set of data tracks as a temporary guard band. The operation(s) at block 805-815 may be performed using the SMR module 130 described with reference to FIGS. 1-4 and/or another module.

Thus, the method 800 may provide for maximizing SMR drive capacity relating to maximizing SMR drive capacity.

It should be noted that the method 800 is just one implementation and that the operations of the method 800 may be rearranged, omitted, and/or otherwise modified such that other implementations are possible and contemplated.

Figure 9:
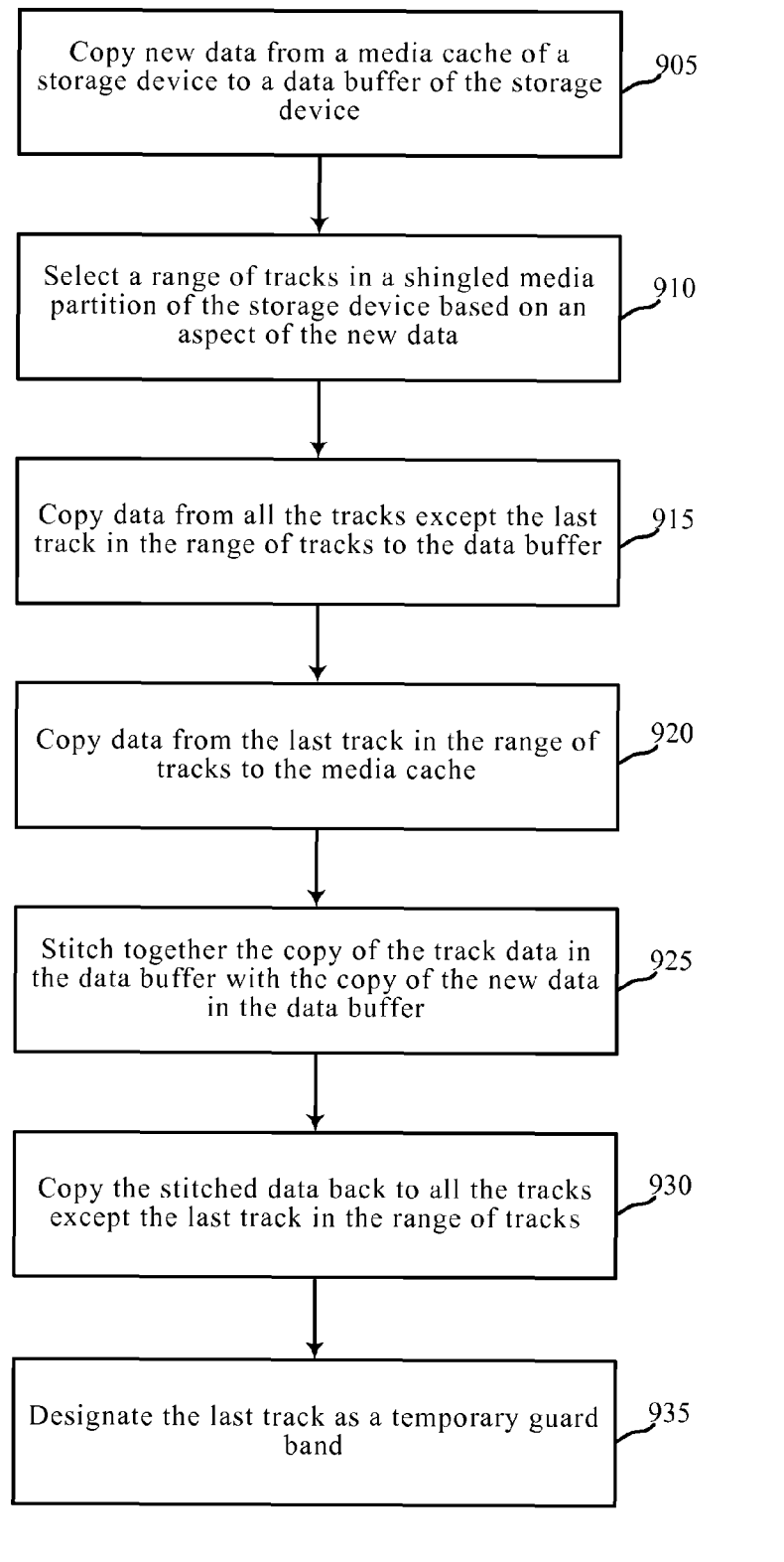
FIG. 9 is a flow chart illustrating an example of a method in accordance with various aspects of this disclosure.

FIG. 9 is a flow chart illustrating an example of a method 900 for maximizing SMR drive capacity, in accordance with various aspects of the present disclosure. One or more aspects of the method 900 may be implemented in conjunction with device 105 of FIG. 1, apparatus 205 of FIG. 2, and/or SMR module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 905, the method 900 may include copying new data from a media cache of a storage device to a data buffer of the storage device. At block 910, the method 900 may include selecting a range of tracks in a shingled media partition of the storage device based on an aspect of the new data. At block 915, the method 900 may include copying data from all the tracks except the last track in the range of tracks to the data buffer. At block 920, the method 900 may include copying data from the last track in the range of tracks to the media cache. At block 925, the method 900 may include stitching together the track data in the data buffer (i.e., the copy of the data from all the tracks except the last track in the range of tracks) with the copy of new data in the data buffer. At block 930, the method 900 may include copying the stitched data back to all the tracks except the last track in the range of tracks. At block 935, the method 900 may include designating the last track as a temporary guard band. The operations at blocks 905-935 may be performed using the SMR module 130 described with reference to FIGS. 1-4 and/or another module.

Thus, the method 900 may provide for maximizing SMR drive capacity relating to maximizing SMR drive capacity. It should be noted that the method 900 is just one implementation and that the operations of the method 900 may be rearranged, omitted, and/or otherwise modified such that other implementations are possible and contemplated.

In some examples, aspects from two or more of the methods 800 and 900 may be combined and/or separated. It should be noted that the methods 800 and 900 are just example implementations, and that the operations of the methods 800 and 900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage device, the storage device comprising:
a main store to store user-accessible data, wherein the main store comprises a shingled media partition and an unshingled media partition;
a media cache to store internal data temporarily for internal operations;
a media scratchpad to store internal data temporarily for internal operations; and
a storage controller to write data to data tracks on the shingled media partition of the main store, wherein the storage controller designates one or more data tracks from the shingled media partition as temporary data track guard bands.

2. The storage device of claim 1, comprising:
the storage controller to identify new data on the media cache to transfer to the main store, wherein the storage controller identifies new data on the media cache to transfer to the main store upon detecting the media cache is within a predetermined range of its capacity or detecting a host of the storage device is idle.

3. The storage device of claim 2, comprising:
the storage controller to select a track range from tracks n to n+m among z total tracks in the shingled media partition of the main store, wherein n comprises a positive integer from 1 to z, m comprises a non-negative integer from 0 to z−1, and z comprises a positive integer greater than 1.

4. The storage device of claim 3, comprising:
the storage controller to copy the identified new data in the media cache to a data buffer, copy data on tracks n to n+m−1 to the data buffer, and copy data on track n+m to the media cache.

5. The storage device of claim 4, comprising:
the storage controller to stitch together the copy of the new data in the data buffer with the copy of the data from tracks n to n+m−1 in the data buffer and copy the stitched data in the data buffer to the media scratchpad.

6. The storage device of claim 5, comprising:
the storage controller to copy the stitched data in the media scratchpad to tracks n to n+m−1, wherein upon writing the copy of the stitched data in the media scratchpad to tracks n to n+m−1, track n+m−1 overlaps both track n+m−2 and track n+m.

7. The storage device of claim 6, comprising:
the storage controller to designate track n+m as a temporary data track guard band, wherein upon writing the copy of the stitched data in the media scratchpad to tracks n to n+m−1, track n+m is overlapped by both track n+m−1 and n+m+1 when track n+m is not track z.

8. The storage device of claim 4, comprising:
the storage controller to determine whether a track g among tracks n to n+m−1 is designated as a guard band; and
the storage controller to determine whether the media cache includes a copy of data from track g.

9. The storage device of claim 8, comprising:
upon determining track g is designated a guard band and the media cache includes a copy of data from track g, the storage controller to copy the data from track g in the media cache to the data buffer;
the storage controller to copy data on tracks n to n+m−1 other than track g to the data buffer;
the storage controller to stitch together the copy of the data from track g in the data buffer with the copy of the new data in the data buffer and the copy of the data from tracks n to n+m−1 other than track g in the data buffer.

10. The storage device of claim 3, comprising:
the storage controller to determine whether track n+m contains valid data;
upon determining track n+m contains no valid data, the storage controller to bypass writing track n+m to the media cache; and
upon determining track n+m contains valid data, the storage controller to determine whether the media cache includes a copy of the data on track n+m.

11. The storage device of claim 10, comprising:
upon determining track n+m contains valid data and the media cache includes a copy of the data on track n+m, the storage controller to bypass writing the data of track n+m to the media cache; and
upon determining track n+m contains data and the media cache does not include a copy of the data of track n+m, the storage controller to copy the data of track n+m to the media cache.

12. The storage device of claim 1, wherein the track range is selected based at least in part on at least one of an amount of data in the media cache, a size of the new data in the media cache, and an association between the new data in the media cache and data currently stored within the selected track range.

13. A method for increasing storage device capacity, comprising:
identifying, via a storage controller, data assigned to be written to a storage device, wherein the storage device includes a main store for user-accessible data, a media cache to temporarily store portions of the user-accessible data, and a media scratch pad to store internal data temporarily for operations internal to the storage device, wherein the main store comprises a shingled media partition and an unshingled media partition; and
writing, via the storage controller, data to data tracks on the shingled media partition of the main store, wherein the storage controller designates one or more data tracks from the shingled media partition as temporary data track guard bands.

14. The method of claim 13, comprising:
identifying, via the storage controller, new data on the media cache to transfer to the main store, wherein the storage controller identifies new data on the media cache to transfer to the main store upon detecting the media cache is within a predetermined range of its capacity or detecting a host of the storage device is idle.

15. The method of claim 14, comprising:
selecting, via the storage controller, a track range from tracks n to n+m among z total tracks in the shingled media partition of the main store, wherein n comprises a positive integer from 1 to z, m comprises a non-negative integer from 0 to z−1, and z comprises a positive integer greater than 1.

16. The method of claim 15, comprising:
copying, via the storage controller, the identified new data in the media cache to a data buffer, data on tracks n to n+m−1 to the data buffer, and data on track n+m to the media cache.

17. The method of claim 16, comprising:
stitching together, via the storage controller, the copy of the new data in the data buffer with the copy of the data from tracks n to n+m−1 in the data buffer; and
copying, via the storage controller, the stitched data in the data buffer to the media scratchpad.

18. The method of claim 17, comprising:

copying, via the storage controller, the stitched data in the media scratchpad to tracks n to n+m−1, wherein upon writing the copy of the stitched data in the media scratchpad to tracks n to n+m−1, track n+m−1 overlaps both track n+m−2 and track n+m; and designating, via the storage controller, track n+m as a temporary data track guard band, wherein upon writing the copy of the stitched data in the media scratchpad to tracks n to n+m−1, track n+m is overlapped by both track n+m−1 and n+m+1 when track n+m is not track z.

19. A computing device configured for increasing a storage capacity of the computing device, comprising:

a processor;

memory in electronic communication with the processor, the memory stores computer executable instructions that when executed by the processor cause the processor to perform the steps of:

identifying data assigned to be written to the computing device, wherein the computing device includes a main store for user-accessible data, a media cache to temporarily store portions of the user-accessible data, and a media scratch pad to store internal data temporarily for operations internal to the computing device, wherein the main store comprises a shingled media partition and an unshingled media partition; and writing data to data tracks on the shingled media partition of the main store, wherein the storage controller designates one or more data tracks from the shingled media partition as temporary data track guard bands.

20. The computing device of claim 19, wherein the instructions executed by the processor cause the processor to perform the steps of:

identifying, via the storage controller, new data on the media cache to transfer to the main store, wherein the storage controller identifies new data on the media cache to transfer to the main store upon detecting the media cache is within a predetermined range of its capacity or detecting a host of the computing device is idle.

* * * * *